Figure 2:
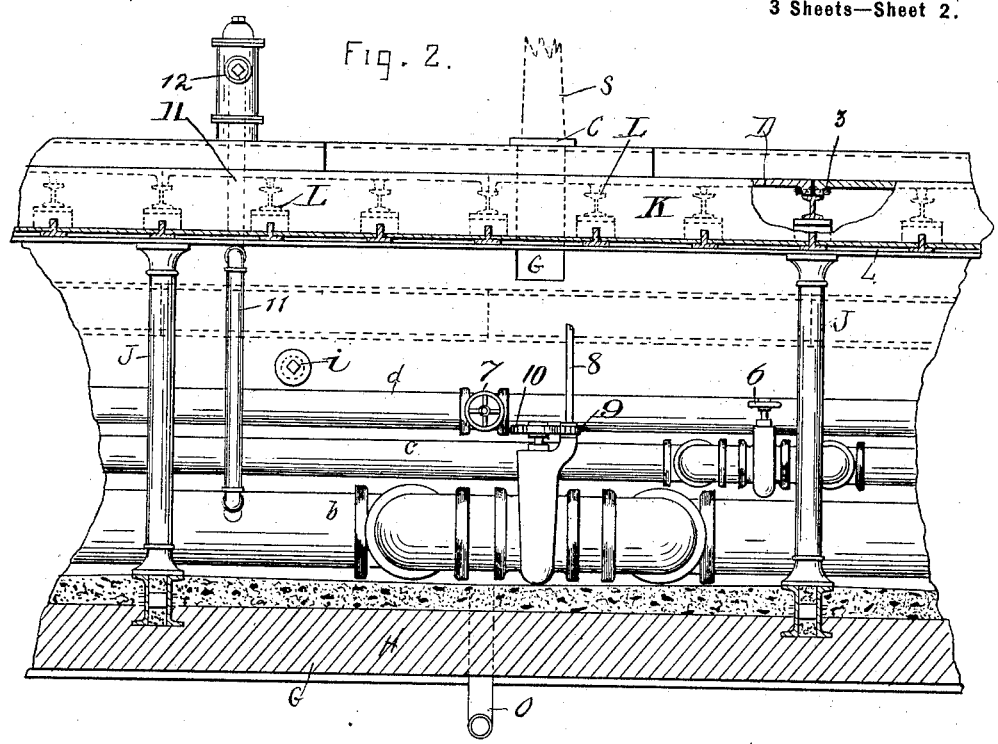

No. 660,540. Patented Oct. 23, 1900.
M. E. DUNNE.
STREET CONDUIT OR SUBWAY.
(Application filed May 10, 1899.)
(No Model.) 3 Sheets—Sheet 1.
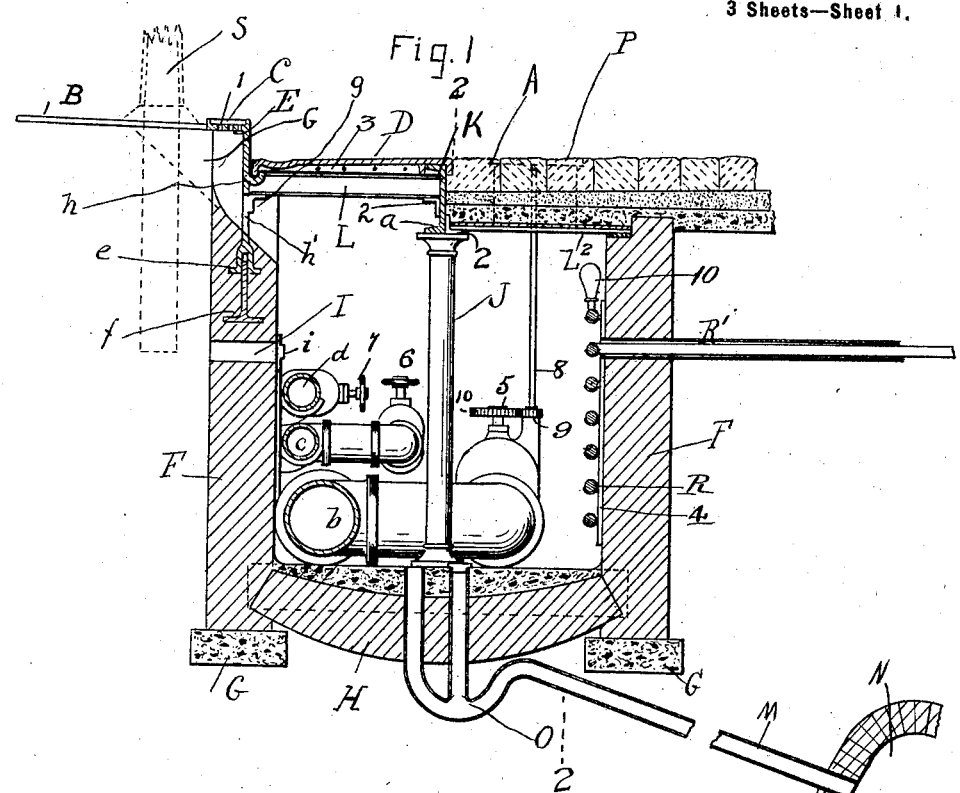
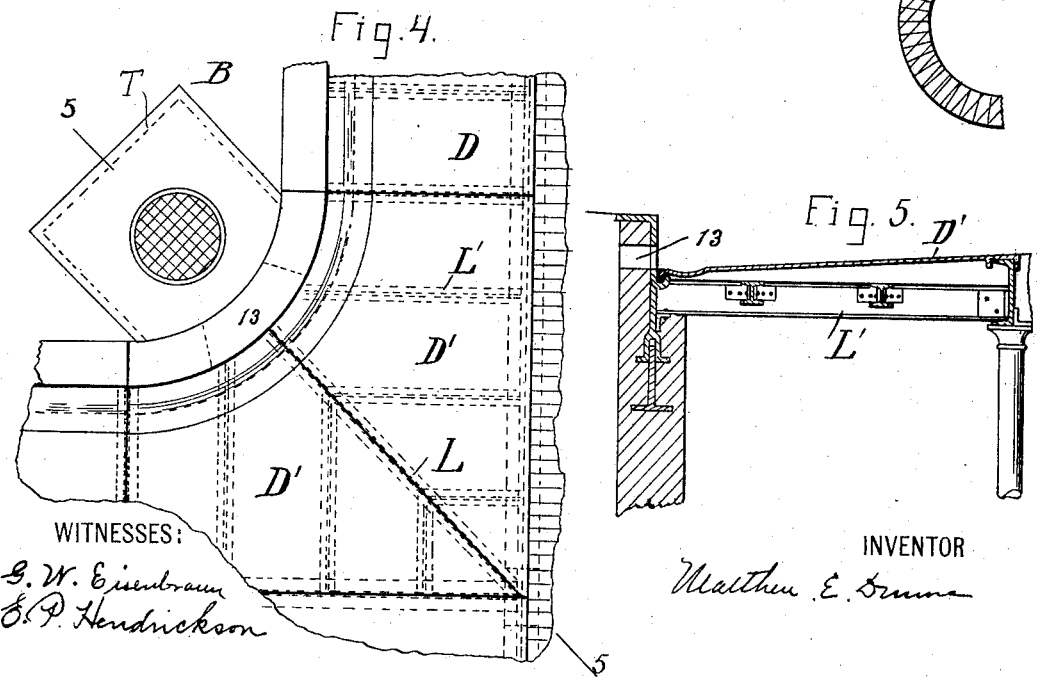
WITNESSES:
G. W. Eisenbraun
E. P. Hendrickson
INVENTOR
Matthew E. Dunne
THE NORRIS PETERS CO., PHOTO-LITHO., WASHINGTON, D. C.

No. 660,540. Patented Oct. 23, 1900.
M. E. DUNNE.
STREET CONDUIT OR SUBWAY.
(Application filed May 10, 1899.)
(No Model.) 3 Sheets—Sheet 2.

WITNESSES:
Geo. W. Eisenbraun
E. P. Hendrickson

INVENTOR
Matthew E. Dunne

No. 660,540. Patented Oct. 23, 1900.
M. E. DUNNE.
STREET CONDUIT OR SUBWAY.
(Application filed May 10, 1899.)
(No Model.) 3 Sheets—Sheet 3.
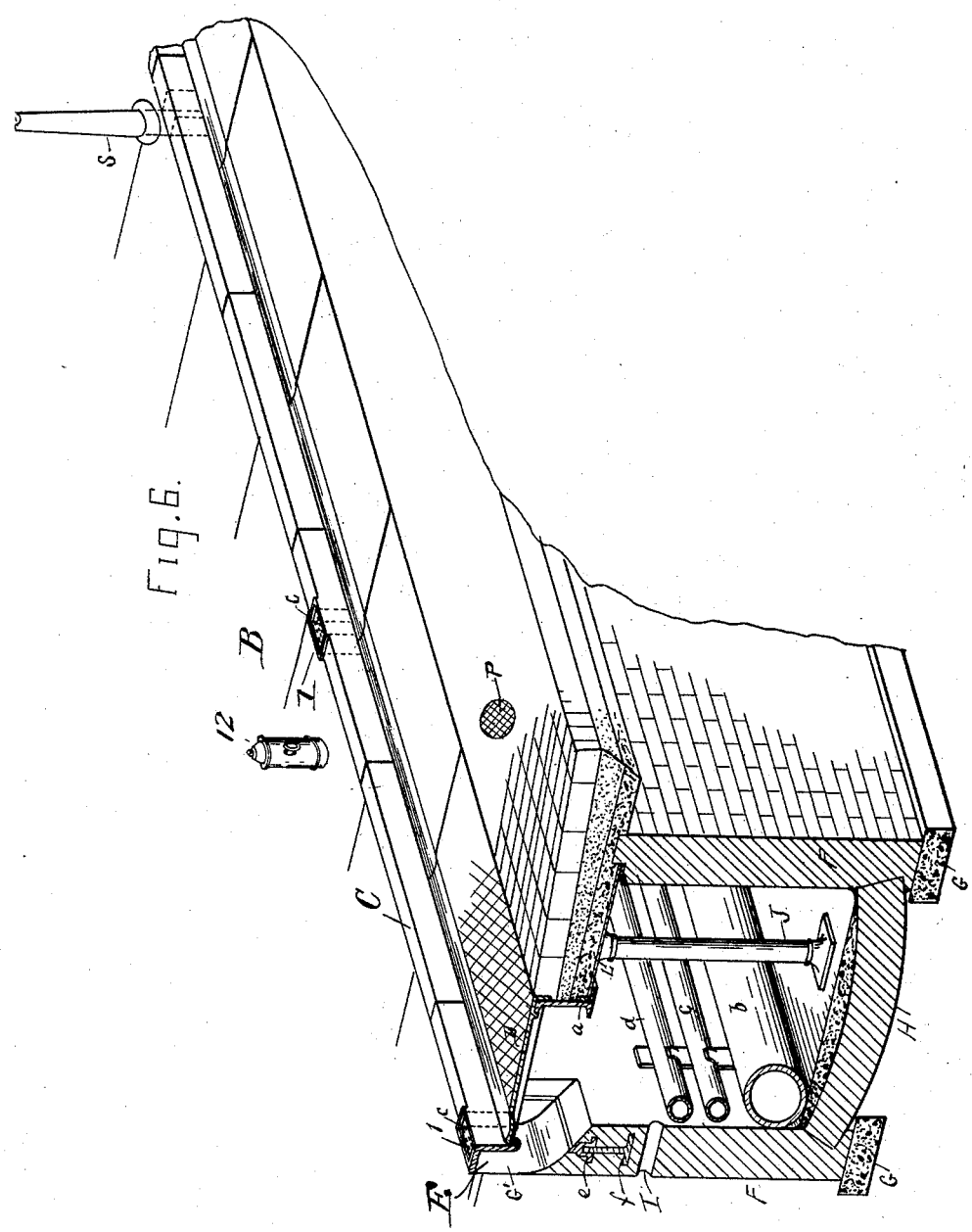
WITNESSES:
G. W. Essenbraun
E. P. Hendrickson
INVENTOR
Matthew E. Dunne

UNITED STATES PATENT OFFICE.

MATTHEW E. DUNNE, OF NEW YORK, N. Y.

STREET CONDUIT OR SUBWAY.

SPECIFICATION forming part of Letters Patent No. 660,540, dated October 23, 1900.

Application filed May 10, 1899. Serial No. 716,324. (No model.)

*To all whom it may concern:*

Be it known that I, MATTHEW E. DUNNE, a citizen of the United States of America, residing in the borough of Manhattan, in the city, county, and State of New York, have invented certain new and useful Improvements in Street Curbs, Gutters, Conduits, or Subways, of which the following is a specification.

My invention has reference to a combined street curb and gutter and conduit or subway for receiving, carrying, holding, and storing gas, water, steam, steam-heating and compressed-air tubes, pneumatic tubes, telegraph, telephone, electric light and power wires and cables, and any and all other pipes, tubes, wires, and cables for general public use and service or other purpose; and it consists in the novel construction, combination, and arrangement of the parts thereof as hereinafter more fully set forth and described, and specifically pointed out in the claims.

The object of my invention is to provide more desirable, practical, and effective constructions than those heretofore known to me, such construction being adapted to insure a uniform and perfect street and avenue curb and grade line, to provide a simple, practical, and effective conduit or subway for receiving, carrying, holding, and storing gas, water, steam, steam-heating and compressed-air pipes, pneumatic tubes, telegraph, telephone, electric light and power wires and cables, and any and all other pipes, tubes, wires, and cables for general public use and service or other purpose, with the purpose of obviating the necessity of tearing or digging up the surface of the streets and avenues to obtain access to the pipes, tubes, wires, and cables, and to connect service of any kind with buildings along the line of such conduit or subway, and thus avoid delay and inconvenience to public traffic. In view of the means provided for the ventilation of such conduit explosions which now occur in subways are prevented and personal injury or loss of life and the destruction of or damage to property are avoided, also by such ventilation the interior of such conduit or subway is kept dry and the perfect operation of the electrical currents passing through the wires and cables placed in such conduit is insured.

With this object in view my invention consists, essentially, in a conduit provided with a series of removable covers arranged longitudinally and joined end to end and with openings for gaining access to said conduit for the purpose of making repairs and for effecting the removal of the covers, combined with a curb or gutter provided with means for supporting said covers on one side and a central beam supported by columns within said conduit and adapted to support the opposite sides of said covers.

My invention also consists in other novel details of construction, as hereinafter more fully pointed out in the accompanying specification and claims.

The nature of my invention will best be understood when described in connection with the accompanying drawings, in which—

Figure 3:
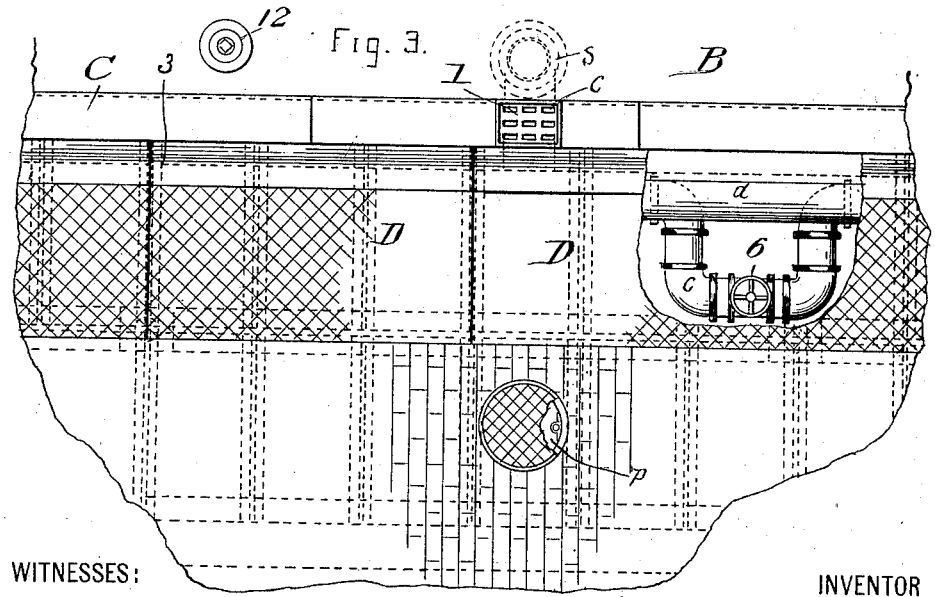

Figure 1 represents a vertical transverse section of a construction embodying my invention. Fig. 2 is a vertical section on the line 2 2, Fig. 1. Fig. 3 is a plan or top view with part broken away. Fig. 4 is a plan view showing the construction at street or avenue corners. Fig. 5 is a vertical section on the line 5 5, Fig. 4. Fig. 6 is a sectional perspective of Fig. 1.

Similar letters and numerals of reference designate corresponding parts throughout the several views of the drawings.

Referring to the drawings, the letter B designates the sidewalk; C, the curb; D, the cover forming the gutter-piece; E, the chambers or openings in the curb through which the conduit is ventilated; F, the side walls of the conduit; G, the foundations for said walls; H, the bottom of the conduit; I, the openings for connecting service with buildings, and J the columns or posts carrying the longitudinal beams $a$.

L $L^2$ are respectively the cross-beams supporting the cover D and the street-pavement A, and M the drain-pipes leading from the bottom of the conduit to the sewer N. O is the trap in said drain-pipe, and P the manhole for gaining access to the conduit from the street.

$b\, c\, d$ are pipes placed within the conduit, and R the wires or cables placed in said conduit.

S is the hollow tube or pole connected with the conduit for the purpose of ventilating the same, and T the catch-basin.

The curb C is composed of suitable lengths or sections which are joined together in a usual manner either by butt or lap joints, and the top or flange of said curb is substantially at right angles with the web and on substantially a level with the flagging or other material composing the sidewalk, said top or flange extending inwardly, as shown in Fig. 1. The bottom of the web of each curb section or length is slotted and spread, as at e, to form an anchorage in the corresponding wall F. Suitable T-rails f are laid in the wall F, with their webs entering the slots in the curb C and said rails breaking joints with said curb, as shown in Figs. 1 and 2, so as to securely hold and fasten said curb in its proper position. The curb is likewise provided on its web with brackets g for supporting the ends of the cross-beams L on one side, and also with a hanger h, adapted to support the ends of the covers D on one side. At convenient distances the curb C is provided with openings h' and the wall F with channels G', with which said channels said openings are in line. The flange of the curb C is provided with suitable screens 1, protecting the openings E in said flange. The edges of said openings are raised above the surface of the walk to prevent ingress of water into the conduit. The object of these channels is to ventilate the conduit. The channels G' may also be connected with vertical hollow tubes or posts S, placed along the surface of the sidewalk B, which may at the same time serve as poles for electric or other lamps for lighting the streets and avenues along the line of conduit. In the conduit are placed columns or posts J, adapted to carry the beams K, arranged longitudinally with respect to the conduit and adapted to support the outer ends of the covers D and also to support the beams L², which carry the pavement B. These columns or posts are securely fastened in the bottom of the conduit, and the beams K are provided with brackets 2, which adapt them to support the outer ends of the beams L and the inner ends of the beams L², the opposite ends of the beams L² being supported by the outer wall F of the conduit.

The removable cover D, forming the gutter-piece, is made in sections of suitable length, which are securely fastened together, so as to prevent ingress of moisture into the conduit, by bolts or other suitable means in such a manner that they can be removed by taking out such bolts, so that additional pipes can be inserted or placed into the conduit or new sections inserted without tearing up the street. This jointure of the sections may be effected, as shown in Figs. 2, 3, and 4, by flanging the adjacent ends of the sections and passing bolts 3 through such flanges in a usual manner. Access can be had to the conduit through manholes P for the purpose of unloosening the fastening of the plates or sections of the cover or for making ordinary repairs. In the side wall, adjacent to the sidewalk, are formed horizontal openings I for connecting service with the buildings along the street or avenue with any of the pipes b c d or with the wires R, as may be required. These openings may be closed by suitable caps i, inserted or otherwise applied from the interior of the conduit. On the wall, adjacent to the street, is secured a series of hangers 4, provided with suitable hooks on which are strung the wires or cables R for telegraphic, telephonic, lighting, and power, or other purposes. Suitable valves 5, 6, and 7 are placed in the several pipes b, c, and d, respectively, for the purpose of enabling the supply to be shut off at certain distances in case of leakage or accident. One or all of the valves in connection with such pipes—for instance, as illustrated in connection with the valve 5—may be provided with means, as the rod 8 and gears 9 and 10, for operating the same from the street-level, so as to avoid the necessity of entering the conduit for this purpose. The water-main (see Fig. 2) may also be connected by pipes 11 with the hydrants 12, commonly employed in cities and known as "fire-hydrants." For draining the conduit in case of leakage the same is connected with the sewer N by means of a pipe M, having a suitable trap O and connecting with the bottom of said conduit. In Figs. 4 and 5 I have shown the construction of the conduit at street-corners. At such junctures the corner-plates or cover-sections D' are matched diagonally and supported by cross-beams L L', as indicated in said figures. The catch-basin T is connected with the gutter above the corner-plates forming part of the cover through an opening 13 for receiving the drainage.

As shown in the drawings, Fig. 1, I prefer to make the walls F perpendicular and form the bottom convex beneath and either flat or concave above. The interior of the conduit is illuminated by electric lamps 10, as shown in Fig. 1, suitably spaced along the length of the conduit. By supporting the different wires or cables upon suitable independent hooks on the hangers 4, as shown in Fig. 1, the high-tension electric wires or cables are separated from the telephone surface wires or low-tension wires, and their service will not be impaired by the former.

What I claim as new is—

1. A conduit provided with a series of removable covers arranged longitudinally and joined end to end and with openings for gaining access to said conduit for the purpose of making repairs and for effecting the removal of the covers, combined with a curb or gutter provided with means for supporting said covers on one side, and a central beam supported by columns within said conduit and adapted to support the opposite sides of said covers substantially as described.

2. A conduit provided with a series of removable covers, arranged end to end and joined by suitable means and said conduit being provided with openings for gaining access to the same for the purpose of making repairs and for effecting the removal of the covers, combined with a curb or gutter provided with means for supporting said covers on one side, a central beam supported by columns within said conduit and adapted to support the opposite sides of said covers and cross-beams supported at opposite ends by the curb or gutter and by said central beam, substantially as described.

3. A conduit provided with a series of removable covers arranged longitudinally and joined end to end and provided with openings for gaining access to said conduit for the purpose of making repairs and for effecting the removal of the covers, combined with a curb or gutter provided with means for supporting said covers on one side, a central beam, supported by columns within said conduit, and adapted to support the opposite sides of said covers, cross-beams supported on opposite sides by the curb or gutter and by said central beam and a series of cross-beams supported by said central beam and by the outer wall of the conduit and carrying a portion of the street-pavement, substantially as described.

4. A conduit formed with inclosing side walls and bottom wall, having lateral openings or passages for connecting service with dwellings, &c., in the wall adjacent to the street-line and with ventilating-openings in the same wall, combined with removable covers, extending from the street-line and a curb or gutter anchored in the same wall and provided with means for supporting one side of said covers, and with openings in line with the ventilating-openings, substantially as described.

5. A curb and gutter forming part of a conduit or subway and consisting of a rail having a horizontal flange substantially on a level with the sidewalk and a web at right angles to said flange and provided with brackets adapted to support the cover of the conduit and with brackets adapted to support the cross-beams of the latter; said curb-piece forming in conjunction with said covers a gutter for conducting away surface water, substantially as specified.

6. A combined curb, gutter and conduit or subway, consisting of a curb having its top or flange substantially at right angles with the web and on a level with the sidewalk and its web provided with a slot and flange, a rail engaging said slot in the web of the curb, and said curb and rail being inclosed in the masonry of the adjacent wall of the conduit as described, brackets formed on said curb and extending outwardly, removable plates forming the gutter and part of the roof of the conduit supported at their inner ends by the brackets on the curb and having their outer portions substantially flush with the surface of the street-pavement, a beam extending longitudinally of the conduit and supporting the opposite sides of the removable plates, columns or posts supporting said beams, beams supporting the street-pavement and supported by the longitudinal beams and by the outer wall of the conduit, manholes provided with suitable covers formed in the street-pavement at convenient distances on the outside of the central beam and columns or posts, openings formed in the inner wall of the conduit and in the curb as described for the ventilation of the conduit, a drain-pipe leading from the bottom of the conduit and suitably connected with a sewer or the like, and means for holding and carrying service pipes, wires, cables, &c., substantially as described.

7. A curb and gutter for streets and avenues in combination with a conduit or subway for receiving, carrying, holding and storing gas, water, steam and compressed-air pipes, pneumatic tubes, telegraph, telephone, electric and power wires, and cables, and all other pipes, tubes, wires and cables for general public use and service, or other purpose as described, consisting of the curb C, the removable cover forming the gutter-piece D, the chambers and passages in the curb and side wall through which the conduit is ventilated, the side walls F, the bottom H, the openings through the walls for service connections I with buildings, the columns or posts J, the cross-beams L and $L^2$, the beam K supporting said cross-beams, and sustained by the columns or posts J, the drain-pipe O suitably trapped, the manholes P, the tube or hollow pole S connecting with the conduit, devices for holding and carrying service pipes, tubes, wires and cables, and for separating high-tension electric or power wires or cables from telephone-wires so that the service of the latter will not be affected or impaired by the former, and means for lighting the interior of the conduit or subway; all constructed and arranged to operate substantially as described.

In testimony whereof I have hereunto set my hand in the presence of two subscribing witnesses.

MATTHEW E. DUNNE.

Witnesses:
ALBERT R. GENET,
G. W. EISENBRONN.